(12) United States Patent
Stegmann et al.

(10) Patent No.: US 10,563,715 B2
(45) Date of Patent: Feb. 18, 2020

(54) BRAKE SHOE

(71) Applicants: SAF-HOLLAND GmbH, Bessenbach (DE); PAUL BRÜSER GmbH, Finnentrop (DE)

(72) Inventors: Rainer Stegmann, Hösbach (DE); Stefan Fleckenstein, Bessenbach (DE); Jean Khoury, Dreieich (DE); Bernd Brüser, Finnentrop-Heggen (DE); Josef Brüser, Finnentrop-Heggen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 85 days.

(21) Appl. No.: 15/750,018

(22) PCT Filed: Jul. 26, 2016

(86) PCT No.: PCT/EP2016/067778
§ 371 (c)(1),
(2) Date: Feb. 2, 2018

(87) PCT Pub. No.: WO2017/021214
PCT Pub. Date: Feb. 9, 2017

(65) Prior Publication Data
US 2018/0231078 A1   Aug. 16, 2018

(30) Foreign Application Priority Data

Aug. 3, 2015   (DE) .................. 10 2015 122 712

(51) Int. Cl.
*F16D 69/00*   (2006.01)
*F16D 65/09*   (2006.01)
(Continued)

(52) U.S. Cl.
CPC .............. *F16D 65/09* (2013.01); *F16D 51/20* (2013.01); *F16D 65/08* (2013.01); *F16D 65/22* (2013.01);
(Continued)

(58) Field of Classification Search
CPC .......... F16D 51/16; F16D 51/18; F16D 51/20; F16D 65/08
See application file for complete search history.

(56) References Cited

U.S. PATENT DOCUMENTS 2,148,257 A * 2/1939 Budd ...................... F16D 65/08
188/250 D
3,114,437 A   12/1963 House
(Continued)

FOREIGN PATENT DOCUMENTS

CN   103727151 A   4/2014
DE   2748335        5/1979
(Continued)

OTHER PUBLICATIONS

Machine translation of DE 102014100174 (no date).*
(Continued)

*Primary Examiner* — Nicholas J Lane
(74) *Attorney, Agent, or Firm* — Price Heneveld LLP

(57) ABSTRACT

A shoe element for use in a drum brake includes a web segment and a support segment, wherein the support segment includes a spherical segment, the web segment includes a web-side engagement segment for interlocking engagement with a shoe web or is integrally formed with a shoe web, and wherein the web segment and the support segment are integrally formed with one another.

19 Claims, 3 Drawing Sheets

(51) Int. Cl.
*F16D 51/20* (2006.01)
*F16D 65/22* (2006.01)
*F16D 65/08* (2006.01)

(52) U.S. Cl.
CPC ............... *F16D 2200/0004* (2013.01); *F16D 2250/0015* (2013.01); *F16D 2250/0023* (2013.01)

(56) References Cited

U.S. PATENT DOCUMENTS

| | | | | |
|---|---|---|---|---|
| 4,360,959 A * | 11/1982 | Johannesen | ............ | B21D 53/34 188/250 C |
| 4,546,862 A * | 10/1985 | Shellhause | ............ | F16D 51/20 188/250 A |
| 4,573,249 A * | 3/1986 | Shellhause | ............ | B23P 15/18 188/250 C |
| 4,573,557 A * | 3/1986 | Shellhause | ............ | F16D 51/20 188/216 |
| 4,736,503 A * | 4/1988 | Stock | ............ | F16D 13/62 29/34 R |
| 5,341,904 A | 8/1994 | Christie | | |
| 5,445,250 A * | 8/1995 | Koschinat | ............ | F16D 65/09 188/328 |
| 5,839,550 A * | 11/1998 | Redgrave | ............ | F16D 65/08 188/250 D |
| 5,992,586 A | 11/1999 | Wemple | | |
| 2012/0103737 A1* | 5/2012 | Drewes | ............ | F16D 51/20 188/219.1 |
| 2014/0202804 A1* | 7/2014 | Wallmeier | ............ | F16D 65/08 188/250 F |
| 2017/0114844 A1* | 4/2017 | Arpaci | ............ | F16D 51/28 |
| 2017/0276196 A1* | 9/2017 | Klumpner | ............ | F16D 51/24 |
| 2018/0231077 A1* | 8/2018 | Stegmann | ............ | F16D 51/20 |

FOREIGN PATENT DOCUMENTS

| | | | | |
|---|---|---|---|---|
| DE | 3046994 | | 9/1981 | |
| DE | 9014704 | | 2/1991 | |
| DE | 4033738 | | 5/1992 | |
| DE | 29704700 | | 7/1997 | |
| DE | 102005036030 | | 2/2007 | |
| DE | 202014101288 | | 5/2014 | |
| DE | 102013112812 | | 5/2015 | |
| DE | 102014100174 | A1 * | 7/2015 | ............ F16D 49/00 |
| EP | 0482567 | | 4/1992 | |
| JP | 2003120730 | | 4/2003 | |

OTHER PUBLICATIONS

Standard DIN 8582 2003-09-00. Manufacturing process forming arrangement; Subdivision, terms, alphabetical overview. [Perinorm].
Standard DIN 8584-2 2003-09-00. Manufacturing processes for drawing presses—Part 2: Pulling; Classification, subdivision, concepts. [Perinorm].
Standard DIN 8586 2003-09-00. Bending forming—classification, subdivision, concepts. [Perinorm].
European Patent Office; International Search Report; Oct. 13, 2016.

* cited by examiner

BRAKE SHOE

BACKGROUND OF THE INVENTION

The present invention relates to a shoe element, particularly for use in a drum brake.

Shoe elements, in particular brake shoes for drum brakes, are known from the prior art. In particular, the shoe elements here are conventionally of substantially arched design and are supported at a first of their two ends in a bearing seat so that they can pivot in relation to the back plate assembly. At the second, remote end an actuating unit acts on the brake shoes, preferably separating or spreading two opposing brake shoes away from one another and consequently pressing these against the inside of a brake drum. In most cases an arrangement comprising two bearing seats with a ball arranged between them has hitherto been used for pivoted support of the brake shoes on a back plate assembly. Here a first bearing seat is arranged on the back plate assembly and a second bearing seat on the shoe element. The ball arranged between the bearing seats allowed the brake shoe to perform multidimensional pivoting movements, so that it could always achieve the correct positioning for a full-face contact pressure against the inside of the brake drum. In the case of the bearings of the brake shoes disclosed by the prior art, however, disadvantages ensue with regard to the large number of components that are necessary for the pivoted bearing support, and to the weight of the arrangement of two bearing seats and a ball, and also with regard to the manufacturing and assembly outlay which is needed in order to assemble the brake system.

The object of the present invention is to provide an improved pivoted support for a shoe element which is lightweight and particularly easy to produce, and which reduces the outlay for assembling the brake shoe.

SUMMARY OF THE INVENTION

According to the invention the shoe element comprises a web segment and a support segment, wherein the support segment comprises a spherical segment, wherein the web segment comprises a web-side engagement segment for interlocking engagement with a shoe web, or is integrally formed with a shoe web, wherein the web segment and the support segment are integrally formed with one other. The spherical segment of the shoe element is, in particular, designed for pivoted support on a corresponding bearing geometry, for example a bearing seat of a back plate assembly of a drum brake. In other words, the spherical segment of the support segment is designed to engage with the bearing seat of a drum brake or the back plate assembly of a drum brake. According to the invention the web-side engagement segment is designed either to be brought into interlocking engagement with a shoe web or it is integrally formed with the shoe web. The web segment and the support segment are integrally formed with one other, wherein the web segment and the support segment are preferably formed on a common sheet-metal part, which is more preferably brought to the corresponding shape by forming. The web segment is preferably a folded area of a sheet-metal part which also comprises the support segment. A folded area is, in particular, taken to mean a segment of a sheet-metal part which protrudes at an angle of 75°-105° from the remaining area of the sheet-metal part. The advantage to folding the web segment is firstly that a strain hardening of the material occurs in the area that is formed by this process, and secondly that the sheet-metal areas extending approximately at right angles to one another provide stiffening to counter torsion. The shoe web is preferably the plate-like support part of a brake shoe of a drum brake. The shoe web here more preferably has an arched extent, wherein its extent in relation to the arched extent, that is to say more preferably in an axial direction of the arched extent, is substantially smaller than in the other directions. In other words, the shoe web is of circular segmental shape in its formation. In a first embodiment provided according to the invention the web segment, which is integrally formed with the support segment, is also integrally formed with the shoe web. This has the advantage that the entire shoe element can be produced by one and the same forming process, thereby eliminating subsequent assembly operations. In a second embodiment proposed according to the invention the web segment comprises means of engagement, which are intended for interlocking engagement with a corresponding engagement segment on a shoe web. In this preferred embodiment the shoe element, together with one or more shoe webs, is designed to form a brake shoe for a commercial vehicle. The advantage of this embodiment is that one and the same shoe element can be used in a plurality of different brake shoes. This means, in particular, that the manufacturing costs for producing the shoe element can be reduced by using the mass production of one and the same shoe element as a basis for a plurality of different brake shoes for drum brakes. For the purposes of the present invention, the spherical segment provided is more preferably an at least in part convexly curved segment of the support segment. Here the spherical segment, for example, may be part of a spherical shell, or part of a hyperbolically curved surface, for example. The spherically shaped formation of the spherical segment has the advantage that the support segment can be used for engagement with bearing seats of a back plate assembly which was intended for engagement with spherical force-transmitting elements. In the case of an elliptical or hyperbolically curved surface, different radii of curvature may be provided in different directions on the spherical segment, which in particular allow an especially good adjustment to the forces acting on the brake shoe element under pivoting motion. Thus, for example, the smaller radius of curvature of the spherical segment may be arranged in the main pivoting plane of the brake shoe, that is to say the plane in which the brake shoe is pivoted when it is actuated. When pivoted in this direction, therefore, the normal of the force transmitted by the brake shoe to the back plate assembly can always run centrally to the extent of the spherical segment and the corresponding geometry of the bearing seat on the back plate assembly. At the same time the chosen radius transversely to the pivoting direction of the drum brake on actuation of the brake shoe can be larger, in order to oppose a larger support surface and a greater resistance to tilting transversely to the pivoting on actuation of the brake shoe of drum brake, particularly in order to damp vibrations.

The convex side of the spherical segment preferably points in a support direction, wherein the web segment extends in the opposite direction to the support direction. The convexly curved side of the spherical segment is therefore the side, by which the support segment or the spherical segment of the support segment is supported on the bearing seat of the back plate assembly. Here the web segment integrally provided on the support segment preferably extends in the opposite direction and more preferably counter and parallel to support direction. The advantage of this formation is that the spherical segment can be pivoted in all directions relative to the bearing seat of the back plate assembly, with an angular tilt relative to the support direction. This allows the freest possible pivoting movement of the shoe element relative to the back plate assembly, so that the brake shoe is able both to perform its operational or actuation pivoting movements, and to compensate for any deformation and oscillations of the brake drum. This serves to ensure that the brake linings of the brake shoe always bear fully on the inside of the brake drum without the occurrence of any distortion of the shoe element.

The support segment and the web segment are more preferably formed together as a sheet-metal part. In this context the term sheet-metal part is understood to mean a component, the wall thickness of which is particularly small compared to the extent in the other directions of the component. The sheet-metal part here is more preferably produced from metal. The advantage of a sheet-metal part is that it is particularly easy to produce by mass production, for example by stamping out from a larger, rolled sheet and is especially well suited to can be fabricated in the form of a shoe element by means of a forming method, such as forging, deep drawing or folding, for example. Furthermore, the wall thickness of the sheet-metal part, which comprises a support segment and a web segment, is advantageously substantially constant. In the context of the present invention this means that the wall thickness of the sheet-metal part in some segments of limited area can be just 0.85 times the mean wall thickness of the sheet-metal part. These areas of only 0.85 times the mean wall thickness occur, for example, in the edge areas between support segment and web segment, where higher degrees of deformation occur. The deviation from the mean value of the wall thickness can more preferably be kept within a range of 0.05 to 0.1 times the mean wall thickness, so that the strength values of the sheet-metal part are reduced locally to the smallest possible degree.

Accordingly, the support segment and the web segment are more preferably produced by means of forming or as a formed part. The forming involved in this influences the material characteristics of the shoe element in a particularly preferred way. Thus a shoe element produced by forming is particularly stable and has particularly favorable material and structural characteristics. It has been shown that a web element which is produced by forming, particularly in the edge areas, has a particularly strong grain structure, which possesses both a high tensile strength and enhanced toughness. In the forming the material structure is strain-hardened, in particular, due to an increase in the dislocation density. This is advantageous particularly for the support segment, since multi-dimensional stress states there can be better withstood than in the case of a material that has not previously been deformed.

In a further preferred embodiment the shoe web has its greatest extent along a web plane, wherein the shoe web can preferably be brought into engagement with the web segment by positive interlock and by a cohesive material joint. Here the positive interlock more preferably acts between the shoe web and the web segment along a direction lying in the web plane. In this way it can more preferably be ensured that forces, which are transmitted from the shoe web to the support segment via the web segment, are transmitted between the shoe web and the web segment entirely via the positive interlock. In order to support an interlocking engagement between the shoe web and the web segment, a cohesive material joint is also preferably provided between these two components. Here the cohesive material joint may preferably be produced by soldering or adhesive bonding, so as more preferably to cause as little heat distortion as possible on the shoe web. In this way it is possible to improve the accuracy of shape of the shoe element as a whole.

The web-side engagement segment is furthermore preferably designed to form an undercut, acting along the web plane, with a shoe-side engagement segment of the shoe web. The web-side engagement segment here is preferably formed as a projection which can be brought into engagement with an accordingly corresponding recess on the shoe web. Here a combination of multiple web-side engagement segments and multiple shoe-side engagement segments is more preferably provided, some of which are formed from projections, which can be brought into engagement with each of the corresponding and opposing recesses. In this way it is possible, for example, through a slight torsional movement of the web segment relative to the shoe web, similar to a bayonet catch, to bring the shoe element into interlocking engagement with the shoe web. Here it may be preferable for the shoe element to be held by an adhesive or a soldered connection in that position in which the positive interlock is formed at least in the force transmitting direction from the shoe web to the web segment and the support segment, so as to absorb all forces and to prevent the web-side engagement segment slipping relative to the shoe-side engagement segment.

The web segment, at least in its areas immediately adjoining the support segment, is preferably plane without any curvature. In contrast to the spherical segment, which is convexly curved, it is preferred that the support segment and preferably also the web segment be substantially plane without any curvature. At the same time a curvature exists between the support segment and the web segment in the area in which the integrally formed sheet-metal body, which comprises the web segment and the support segment, is bent at an angle. In other words, the web segment, apart from its wall thickness, preferably does not have any significant extent transversely to the web plane. The substantially plane formation of the web segment without any curvature is particularly suited to the transmission of tensile and compressive forces and between the support segment and the shoe web. In particular, it is possible here to avoid bulging or buckling of the web segment, since compressive forces acting on the web segment do not generate any force components acting transversely or perpendicularly to the web plane.

The support segment furthermore preferably comprises a plane segment, wherein the spherical segment directly adjoins the plane segment and is at least in some areas surrounded thereby. The plane segment of the support segment is more preferably arranged in such a way that it surrounds the spherical segment substantially in its entirety. In other words, the plane segment of the support segment is arranged at least between the spherical segment and the web segment. An area in which the sheet-metal body forming the support segment and the web segment is bent or bent off, is furthermore preferably provided between the plane segment and the web segment. It goes without saying that in this area the shoe element has a curvature, wherein one of the ends of the curvature preferably runs substantially at a tangent to the web plane and the second end of the curvature runs substantially perpendicular to the web plane. Providing a plane segment on the support segment facilitates the production or forming of the spherical segment, since the support segment can be held on the plane segment during the forming process, in order to then form the spherical segment, for example by drop forging or deep drawing or some other suitable forming method.

The plane segment and the web segment more preferably adjoin one another in a bent segment, wherein the bent segment has a curvature of approximately 90°. The bent segment is preferably the area of the shoe element in which the shoe element is bent in order to form the support segment at a first end of the bend and to form the web segment at the second end of the bend. The plane segment of the support segment more preferably stands substantially perpendicular to the web segment. The bent segment therefore preferably spans a segment of an arc of approximately 90°. Owing to the usual tolerances in the context of the present invention, this gives a circular section of preferably 86° to 104° for the bent segment, which is spanned by the bent segment.

The radius of curvature of the bent segment is furthermore preferably 0.05 to 0.3 times the radius of curvature of the spherical segment. It has emerged on the one hand that a sufficiently high deformation, or a degree of deformation high enough to produce the preferred strain hardening in the grain structure of the material of the shoe element, can be achieved particularly in this area. On the other hand, by adhering to the lower limit of this radius the cracking of the outer side of the surface of the curvature is prevented. The material of the shoe element is more preferably designed for the requirements of the spherical segment. It is therefore advantageous to match the radius of curvature of the bent segment to the radius of curvature of the spherical segment.

The spherical segment is more preferably formed so that it is rotationally symmetrical in the support direction. The support direction is preferably an axis of rotational symmetry of the spherical segment. In other words, in this embodiment the spherical segment is preferably formed as part of a spherical shell. The spherical segment is preferably convexly curved in a support direction, wherein the support direction preferably extends parallel to the web plane. The support direction is preferably the direction along which the support segment, in its spherical segment formed for this purpose, can be supported on the bearing seat on a back plate assembly.

The support direction here is more preferably the direction along which the force is substantially transmitted from the bearing seat of the brake-shoe back plate assembly in the support segment. It goes without saying that the direction of this force constantly varies due to the pivoting movements of the brake shoe relative to the back plate assembly. The support direction is therefore preferably oriented in such a way that, taken proportionally over all the operating states of the brake shoe, the greatest proportion of the brake force or support reaction of the carrier element is transmitted substantially along or parallel to the support direction.

Furthermore, according to the invention a method is proposed for producing a brake shoe, which comprises the following steps: a) provision of a stamped part having a support segment; b) forming of the support segment in such a way that a spherical segment is formed; c) forming of the stamped part and producing of a first web segment, adjacent to the support segment, wherein the first web segment extends substantially transversely to the support segment. A distinguishing feature of the method according to the invention is that a brake shoe can be produced in a particularly easy and time-saving manner by substantially just two operations. Here, in a first operation a support segment is produced from a stamped part merely through unidimensional forming. In a second operation the stamped part is formed in such a way that a web segment is also produced in addition to the support segment. In this way the entire brake shoe or preferably at least a substantial part of the brake shoe can be produced solely by forming, without further assembly work. The forming is particularly suited to the mass production of brake shoes in the form of sheet-metal parts, wherein a multiplicity of brake shoes can be produced in a very short time by just two operations through series linking of the respective machines for performing the two operations "shaping of the support segment" and "shaping of the web segment". In this way it is possible, in particular, to significantly reduce the manufacturing costs and also the manufacturing time for the production of brake shoes. In addition, there is no need for further assembly of spherical force-transmitting elements or similar additional parts on the brake shoe. The method for producing a brake shoe as defined by the present invention therefore affords an especially cost-effective and particularly simple production of brake shoes, which instead of a spherical force-transmitting element preferably comprise a spherical segment.

Drop forging or deep drawing are more preferably used for forming the support segment. The advantage of these methods of manufacture is that a change in grain structure occurs during the forming, corresponding to the main forming direction. This phenomenon is also referred to as strain hardening, wherein the change in grain structure during the forming significantly increases the material strength and the resistance to brittle fracture. During the forging, in particular, a favorable grain flow pattern is imparted to the material. The advantage both of the deep drawing and of drop forging is that the susceptibility to cracking can be reduced and the reliability of the component therefore significantly increased. The more favorable production costs both for the tooling and for performing the process, and the smaller forces required on the machine may be cited as the advantages of deep drawing. It is to be regarded as a disadvantage of drop forging in this context that a minimum quantity of forgings of the same type has to be produced in order to cover the costs for a die and the corresponding bottom die. An advantage of drop forging is that the change in grain structure is particularly open to positive influencing, since overall a smaller degree of deformation is required than with deep drawing.

A method of deep drawing is more preferably used for forming the stamped part in order to form the first web segment. Deep drawing is particularly suited to forming the areas of the support segment and the web segment standing substantially perpendicular to one another. The deep drawing could be combined with a method of denting, in which a substantially semispherical geometry of an upper die part presses the area of the support segment, in which the spherical segment is to be formed, into a substantially semispherical trough in a bottom die of the deep drawing machine and at the same time both the upper die part and the lower die part are displaced relative to an outer wall of the deep drawing machine, in order to fold the web segment relative to the support segment against this outer wall.

In an especially preferred embodiment the shaping of the support segment and the bending of the web segment are performed in one operation. In this way, in the method according to the invention for producing a brake shoe, the production time and the production costs can more preferably be significantly reduced once again. A substantial advantage is that only one machine, which in an especially preferred embodiment also performs only one unidimensional downward movement, is required for producing the brake shoe. It goes without saying that, by performing the steps of the method according to the invention and preferably provided, the characteristics of the subject of the invention are also improved, particularly in that through the various forming processes local grain structure strain hardenings can be produced, which reduce the susceptibility to cracking of the brake shoe and increase the strength and dimensional stability of the brake shoe. In particular, in the case of the present brake shoe welding processes can be dispensed with and any distortion of the brake shoe due to thermal stresses can be prevented.

Further advantages and features of the present invention emerge from the following description, referring to the figures attached. It will be obvious here that individual features disclosed in only one embodiment shown can also be used for other embodiments, unless this is has been explicitly excluded or is ruled out due to technical conditions.

DETAILED DESCRIPTION OF THE PREFERRED EMBODIMENTS

Figure 1:
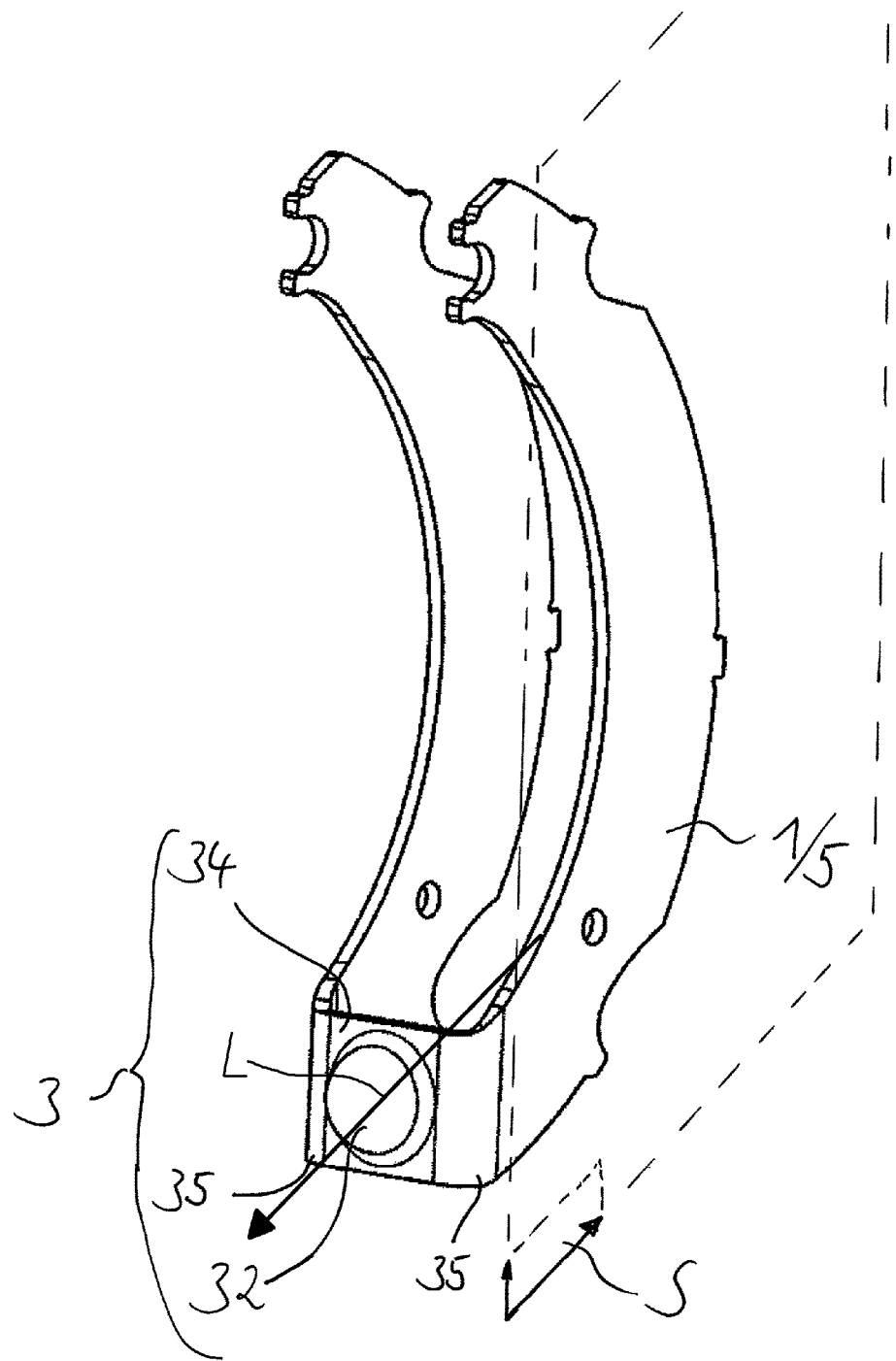
FIG. 1 shows a perspective view of a preferred embodiment of the shoe element according to the invention.

The shoe element shown in FIG. 1 comprises a web segment 1, which is preferably integrally formed with a shoe web 5. The shoe element here more preferably comprises two web segments, which are spaced at a distance from one another and are arranged on two sides or at two ends of the support segment 3. The support segment 3 comprises a spherical segment 32, which is intended to support the shoe element on the back plate assembly, in particular on the bearing seat of a back plate assembly of a drum brake system. For this purpose the spherical segment 32 preferably has an at least partially spherical surface, which more preferably possesses a hardened surface structure, in order to be able to engage with as little resistance as possible on a back plate assembly. The spherical segment 32 of the support segment 3 ensures a pivoted support of the shoe element on the back plate assembly of a drum brake. The web segment 1 and the shoe web 5 integrally formed therewith preferably extend substantially in or parallel to a web plane S, wherein the two web segments 1 and the corresponding shoe webs 5 are each separated by a distance from one another transversely to the web plane. The shoe webs 5 and/or the web segments 1 more preferably run parallel to one another and parallel to the web plane S. Not shown in the figure is the fact that a brake lining plate, which is likewise curved, can be fixed on the convexly curved side of the shoe webs 5, wherein the brake lining plate extends substantially transversely to the web plane S and can be fixed on the side of the brake lining plate remote from the shoe element or the web segments 1 and the shoe webs 5 in order to support brake linings. The spherical segment 32 is preferably convexly curved in a support direction L, wherein the support direction L preferably extends parallel to the web plane S. The support direction L is preferably the direction along which the support segment 3, in its spherical segment 32 formed for this purpose, can find support on the bearing seat on a back plate assembly (not shown). The support segment 3 preferably comprises a plane segment 34, which extends substantially transversely to the web plane S and more advantageously substantially encloses the spherical segment 32. The plane segment 34 facilitates the production of the spherical segment 32, since the body for producing a shoe element can more preferably be firmly clamped in this area, in order to produce the spherical segment 32 by forming. Bent segments 35 each assigned to the support segment 3 are furthermore provided between the support segment 3 and the web segment 1 or the shoe web 5. The bent segments 35 are substantially rounded. Here the bent segments 35 have a curvature of approximately 90°. At their respective ends the bent segments 35 are each formed at a tangent to the plane segment 34 of the support segment and to the web segment 1 or the shoe web 5.

Figure 2:
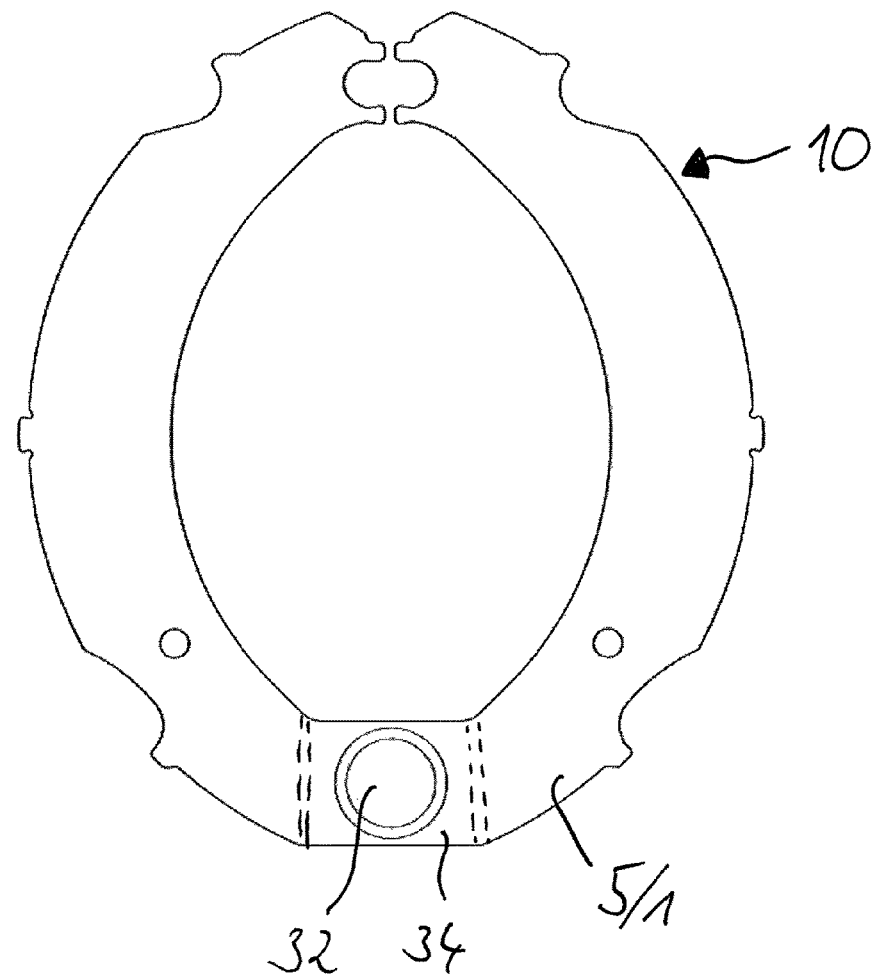
FIG. 2 shows a view of a preferred embodiment of the stamped part for performing the method according to the invention for producing a brake shoe.

FIG. 2 shows a stamped part 10, which in a method according to the invention can be worked to form the preferred embodiment of the shoe element shown in FIG. 1. The stamped part 10 here already has areas which are formed to produce a spherical segment 32 and to produce web segments 1 or shoe webs 5. The stamped part 10 furthermore already comprises a plane segment 34, within which the spherical segment 32 can be formed by the preferred forming method such as drop forging or deep drawing. The advantage of using a stamped part 10 is that this part is easy to produce and already contains all the contours which to define further elements on the shoe element to be produced from the stamped part 10.

Figure 3:
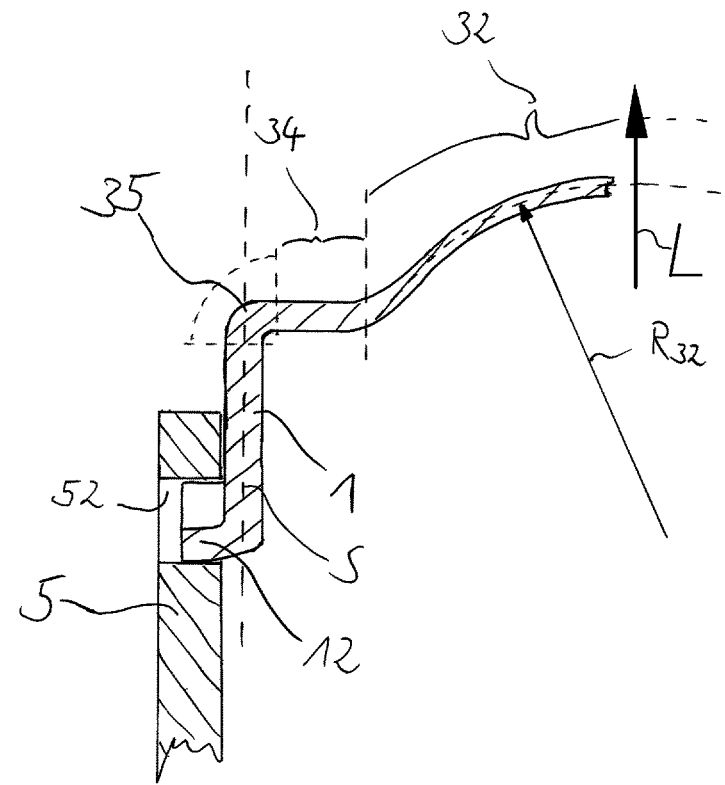
FIG. 3 shows a sectional view of a preferred embodiment of the shoe element according to the invention.

FIG. 3 shows a sectional view of an alternative embodiment of a shoe element according to the invention. Here the web segment 1 and the shoe web 5 are not integrally formed with one another. Instead the web segment 1 comprises a web-side engagement segment 12 and the shoe web 5 comprises a shoe-side engagement segment 52. Both engagement segments 12, 52 are designed to form a positive interlock between the web segment 1 and the shoe web 5. A support segment 3 is furthermore preferably provided, adjacent to the web segment 1 and integrally formed therewith, wherein the support segment 3 comprises a bent segment 35, a plane segment 34 and a spherical segment 32. The spherical segment 32 is preferably of curved formation with a radius of curvature $R_{32}$. It goes without saying that this radius of curvature can be measured both in the plane of section shown in FIG. 3, and also preferably in a sectional view parallel to the web plane S shown in FIG. 3. It is furthermore disclosed that the bent segment 35 preferably describes an angle of approximately 90°. In this context angular deviations of −5° to +5° are provided for within the scope of the invention.

Figure 4:
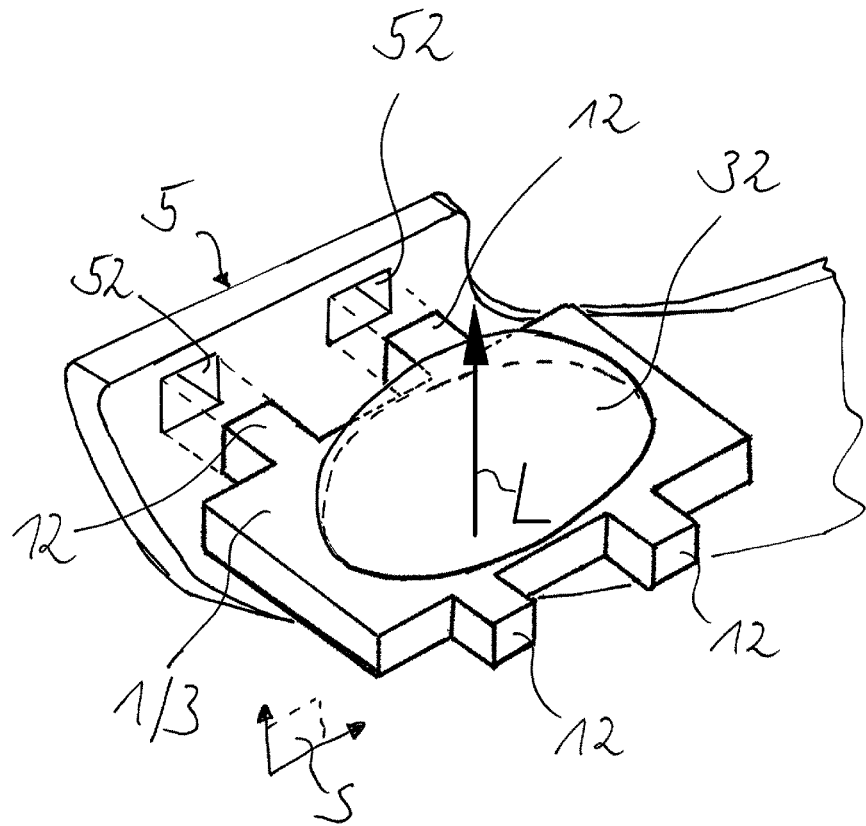
FIG. 4 shows a perspective view of a preferred embodiment of the shoe element according to the invention.

FIG. 4 shows a further preferred embodiment a shoe element according to the invention, wherein the web segment 1 and the support segment 3 are formed as an integrally formed component, wherein four web-side engagement segments 12, which can be brought into engagement with suitably corresponding shoe-side engagement segments 52 on the shoe web 5, are preferably provided on the web segment 1, in order to fix the web segment 1 and the support segment 3 on the shoe web 5 by positive interlock. The only thing not shown in the figure is the fact that a further shoe web 5 is provided on the opposite side of the shoe web 5 shown, in order to engage with the two opposite web-side engagement segments 12. The advantage of the embodiment shown in FIG. 4 is that substantially plane components or stamped parts can be used to produce a brake shoe, wherein only the support area 3 needs to be deformed in order to form the spherical segment 32, whilst all other components can already be produced in one stamping operation and provided in the correct form. In particular, is no forming is necessary on the shoe webs 5, thereby reducing the manufacturing outlay. Only the shoe-side engagement segments 52 need to be cut out from the material of the shoe web 5 during the production process. The spherical segment is preferably not of circularly rounded design, but rather has a substantially elliptical basic shape. In this way various pivoting patterns of the brake shoe or the shoe element on a back plate assembly can be produced in different braking directions. In this way it is possible to exert a positive influence on the wearing of the spherical segment 32, since a larger radius of curvature can be provided in the direction of the frequent pivoting movements, in order to distribute the sliding friction there over a larger frictional surface area than in the case of pivoting directions running transversely to these. The support direction L explained with reference to FIG. 1 is also shown in FIG. 3 and FIG. 4.

LIST OF REFERENCE NUMERALS

1—web segment
3—support segment
5—shoe web
10—stamped part
12—web-side engagement segment
32—spherical segment
34—plane segment
35—bent segment
52—engagement segment
L—support direction
S—web plane

The invention claimed is:
1. A shoe element for use in a drum brake, comprising; a web segment; and a support segment; wherein the support segment comprises a spherical segment; wherein the web segment comprises a web-side engagement segment this is at least one of configured to interlockingly engage with a shoe web, and is integral with a shoe web; wherein the web segment and the support segment are integral with one another; wherein a convex side of the spherical segment points in a support direction, and wherein the web segment extends in an opposite direction to the support direction; wherein the support segment comprises a plane segment, and wherein the spherical segment directly adjoins the plane segment and is at least in some areas surrounded by the plane segment; and wherein the plane segment and the web segment adjoin one another in a bent segment, and wherein the bent segment has a curvature of about 90°.

2. The shoe element as claimed in claim 1, wherein the support segment and the web segment are a sheet-metal part.

3. The shoe element as claimed in claim 2, wherein a wall thickness of the sheet-metal part is substantially constant.

4. The shoe element as claimed in claim 3, wherein the shoe web extends the greatest along a web plane, and wherein the shoe web is configured to be brought into engagement with the web segment by positive interlock and by a cohesive material joint.

5. The shoe element as claimed in claim 4, wherein a web-side engagement segment is configured as an undercut acting with a shoe-side engagement segment of the shoe web along the web plane.

6. The shoe element as claimed in claim 5, wherein the web segment, at least in its areas immediately adjoining the support segment, is plane without any curvature.

7. The shoe element as claimed in claim 6, wherein the spherical segment is configured such that the spherical segment is rotationally symmetrical in the support direction.

8. The shoe element as claimed in claim 1, wherein the support segment and the web segment are a sheet-metal part.

9. The shoe element as claimed in claim 8, wherein a wall thickness of the sheet-metal part is substantially constant.

10. The shoe element as claimed in claim 1, wherein the shoe web extends the greatest along a web plane, and wherein the shoe web is configured to be brought into engagement with the web segment by positive interlock and by a cohesive material joint.

11. The shoe element as claimed in claim 10, wherein the web-side engagement segment is configured as an undercut acting with a shoe-side engagement segment of the shoe web along the web plane.

12. The shoe element as claimed in claim 1, wherein the web segment, at least in its areas immediately adjoining the support segment, is plane without any curvature.

13. The shoe element as claimed in claim 1, wherein the support segment comprises a plane segment, and wherein the spherical segment directly adjoins the plane segment and is at least in some areas surrounded by the plane segment.

14. The shoe element as claimed in claim 13, wherein the plane segment and the web segment adjoin one another in a bent segment, and wherein the bent segment has a curvature of about 90°.

15. The shoe element as claimed in claim 1, wherein the spherical segment is configured such that the spherical segment is rotationally symmetrical in the support direction.

16. A method for producing a brake shoe, comprising: forming a support segment of the brake shoe such that the support segment includes a spherical segment and a plane segment; wherein a convex side of the spherical segment points in a support direction; wherein the spherical segment directly adjoins the plane segment and is at least in some areas surrounded by the plane segment; and wherein the plane segment and the web segment adjoin one another in a bent segment where the bent segment has a curvature of about 90°; and forming a stamped part of the brake shoe such that the stamped part includes a first web segment adjacent to the support segment, wherein the first web segment extends substantially transversely to the support segment.

17. The method as claimed in claim 16, wherein the support segment is formed via at least one of drop forging and deep drawing.

18. The method as claimed in claim 16, wherein a method of deep drawing is used to form the first web segment.

19. The method as claimed claim 16, wherein a shaping of the support segment and a bending of the web segment are performed in a single step.

* * * * *